US008944119B2

(12) United States Patent
Yang et al.

(10) Patent No.: US 8,944,119 B2
(45) Date of Patent: Feb. 3, 2015

(54) METHOD AND SYSTEM OF GAS REFILLING MANAGEMENT FOR GAS STORAGE CANISTER UTILIZING IDENTIFICATION ACCESSING CONTROL

(75) Inventors: Jefferson Ys Yang, Orange, CA (US); Feng-Hsiang Hsiao, Taipei (TW); Hong-Shi Chang, Miaoli County (TW); Chih-Hsueh Chen, Miaoli County (TW)

(73) Assignee: Asia Pacific Fuel Cell Technologies Ltd., Miaoli County (TW)

( * ) Notice: Subject to any disclaimer, the term of this patent is extended or adjusted under 35 U.S.C. 154(b) by 824 days.

(21) Appl. No.: 12/975,967

(22) Filed: Dec. 22, 2010

(65) Prior Publication Data
US 2011/0226382 A1  Sep. 22, 2011

(30) Foreign Application Priority Data
Dec. 25, 2009 (TW) ................................. 98145000 A (51) Int. Cl.
*B65B 1/04* (2006.01)
*F17C 13/00* (2006.01)
(52) U.S. Cl.
CPC .............. *F17C 13/003* (2013.01); *Y02E 60/321* (2013.01); *Y02E 60/327* (2013.01)
USPC ... 141/3; 141/83; 141/94; 141/95; 340/572.1; 340/614
(58) Field of Classification Search
CPC ................................ F17C 1/00; F17C 13/0033
USPC ......... 141/2, 3, 4, 83, 94, 95; 340/572.1, 605, 340/612, 614
See application file for complete search history.

(56) References Cited

U.S. PATENT DOCUMENTS

| | | | | |
|---|---|---|---|---|
| 4,667,708 A | * | 5/1987 | Jernberg | 141/1 |
| 5,913,344 A | * | 6/1999 | Wronski et al. | 141/83 |
| 5,922,158 A | * | 7/1999 | Culp et al. | 156/86 |

(Continued)

FOREIGN PATENT DOCUMENTS

| | | |
|---|---|---|
| CN | 1523259 | 8/2004 |
| CN | 1538348 | 10/2004 |

(Continued)

OTHER PUBLICATIONS

Xiao, Shijie Title: Design and Implementation of Gas Cylinder Management System Based on RFID Master's Thesis Publication of Xiamen University, CN Publication Date: Jun. 26, 2007.

*Primary Examiner* — Timothy L Maust
(74) *Attorney, Agent, or Firm* — Kirton McConkie; Evan R. Witt (57) ABSTRACT

A method and system of gas refilling management for gas storage canister utilizing identification accessing control includes an identification information transmission device, a control device, and a gas refilling equipment, which are applicable for management of refilling of at least one storage canister. The storage canister is provided with an information identification label, which contains at least one record of canister information. By using the identification information transmission device to first read the information contained in the label of a storage canister, the control device may then set a refilling condition based on which the gas refilling equipment carries out a refilling operation to the storage canister, so as to suit for management of refilling various types of gas storage canisters to provide the best performance in a practical application.

20 Claims, 6 Drawing Sheets

(56) References Cited

U.S. PATENT DOCUMENTS

| | | | | |
|---|---|---|---|---|
| 5,964,254 A * | 10/1999 | Jackson | ............. | 141/21 |
| 6,630,648 B2 * | 10/2003 | Gruenwald | ............. | 219/385 |
| 6,761,066 B2 * | 7/2004 | Rait | ............. | 73/295 |
| 6,955,198 B2 * | 10/2005 | Wodjenski | ............. | 141/248 |
| 7,033,467 B2 * | 4/2006 | Cheng | ............. | 204/266 |
| 7,128,101 B2 * | 10/2006 | Cantacuzene | ............. | 141/94 |
| 7,237,428 B2 * | 7/2007 | DaCosta et al. | ............. | 73/19.07 |
| 7,238,020 B2 * | 7/2007 | Yang et al. | ............. | 431/11 |
| 7,248,993 B2 * | 7/2007 | Cheng et al. | ............. | 702/156 |
| 7,415,995 B2 * | 8/2008 | Plummer et al. | ............. | 141/197 |
| 7,441,569 B2 * | 10/2008 | Lease | ............. | 141/95 |
| 7,619,523 B2 * | 11/2009 | Durtschi et al. | ............. | 340/572.1 |
| 7,768,409 B2 * | 8/2010 | Parias | ............. | 340/573.1 |
| 8,028,726 B2 * | 10/2011 | Easton | ............. | 141/95 |
| 8,191,584 B2 * | 6/2012 | Kesten et al. | ............. | 141/3 |
| 8,618,938 B2 * | 12/2013 | Masin | ............. | 340/572.8 |
| 2008/0251074 A1 * | 10/2008 | Sand | ............. | 128/204.18 |
| 2011/0140850 A1 * | 6/2011 | Wassel et al. | ............. | 340/8.1 |

FOREIGN PATENT DOCUMENTS

| | | |
|---|---|---|
| CN | 101561078 | 10/2009 |
| EP | 1390204 B1 | 12/2004 |
| JP | H0875096 | 3/1996 |
| JP | H08250140 | 9/1996 |
| JP | 2004360851 | 12/2004 |
| JP | 2007192310 | 8/2007 |
| JP | 4009421 | 11/2007 |
| JP | 2008261406 | 10/2008 |
| TW | 426511 | 3/2001 |
| TW | 569003 | 1/2004 |
| TW | 572833 | 1/2004 |
| TW | 572833 B | 1/2004 |

* cited by examiner

METHOD AND SYSTEM OF GAS REFILLING MANAGEMENT FOR GAS STORAGE CANISTER UTILIZING IDENTIFICATION ACCESSING CONTROL

FIELD OF THE INVENTION

The present invention relates to gas refilling management of a storage canister, and in particular to a method and system of gas refilling management for a gas storage canister utilizing identification accessing control.

BACKGROUND OF THE INVENTION

Storage of gas in a canister as a storage container is a common practice. Taking a hydrogen storage canister as an example for explanation, both a hydrogen fuel cell system and an application device powered by hydrogen fuel cells require a proper supply of hydrogen. Hydrogen storage is commonly categorized as pressurized hydrogen, liquid hydrogen, and hydrogen storage alloy, among which pressurized hydrogen is of high energy, high weight, and high density but is also high in volume and poor in safety. Liquid hydrogen is also of high energy, high weight, and high density, but a large consumption of energy is required for liquefaction of hydrogen, and must be stored in a thermal insulation tank. This makes the liquid hydrogen fit for storage in a large-sized tank. For general applications, hydrogen storage alloy is a practical solution, which uses a canister to serve as a storage container for storage of hydrogen.

For both transportation and stationary or portable electrical power supply systems, which are powered by a hydrogen storage canister, replenishment of hydrogen must be made after the hydrogen storage canister runs out of hydrogen storage. This is generally done by exchanging with a fully charged canister at an exchange station. The exchange station then forwards the exhausted canister to a hydrogen supplier for re-charge or alternatively, the exchange station makes on-site re-charge of hydrogen for the exhausted canister.

SUMMARY OF THE INVENTION

However, storage canisters are available in various specifications and types and may be of diverse conditions of use, making the canisters different in parameters, such as net weight, gas storage material, and times of re-charge. A conventional gas charge process is often conducted in a very rough standard of refilling, and does not allow for adjustment of the process in order to suit diversity between different canisters. Thus, due to the diverse pre-charge conditions of canisters, the performance of the canisters, after charged, may be quite different from each other, and this in turn causes undesired troubles, such as insufficient charge of hydrogen, when the canisters so charged are used in a hydrogen fuel cell system or a hydrogen application system, such as a fuel cell powered vehicle, Thus, an objective of the present invention is to provide a method and system of gas refilling management for a gas storage canister utilizing identification accessing control, which is applicable to various types of canister and various types of gas for gas refilling management, so as to allow for the best performance of the storage canister in a practical operation.

The solution adopted in the present invention to overcome the problems of the conventional techniques comprises an identification information transmission device, a control device, and a gas refilling equipment, which are applicable for management of refilling of at least one storage canister. The storage canister is provided with an information identification label, which contains at least one record of canister information.

An identification information transmission device is first used to read the information contained in the label of a storage canister, and the control device then makes a judgment based on the label information to set refilling conditions, and finally, the gas refilling equipment carries out a refilling operation to the storage canister based on the refilling conditions so set.

In a preferred embodiment, detection is selectively made in respect of the quantity of gas stored in the storage canister after the refilling operation, and the gas storage quantity so detected is used to update the information stored in the label. Further, a comparison may be selectively made between the gas storage quantity so detected and a initial storage capacity in order to determine if the gas storage capacity of the storage canister deteriorates.

With the technical solution provided by the present invention, management of refilling of storage canisters can be realized so that through efficient and easy reading of the label information of the canister and determination made according to the label information so read, optimum refilling conditions (such as pressure, temperature, gas flowrate, and the likes) can be set up to ensure optimum refilling performance and result for every type of storage canister. Further, through updating of the information contained in the information identification label, data associated with a refilling operation can be stored in a system parameter database, whereby the data so stored allows for tracking the history of the canister. This allows the management of canister to effectively handle the situation of the canister in respect of both refilling, inspection, reconditioning, reworking, testing, and maintenance based on the information and the system parameter database, whereby management of all types of storage canister is unified and management of canister refilling is enhanced and the excellent management so made allow for the best performance of the storage canister in practical applications.

BRIEF DESCRIPTION OF THE DRAWINGS

The present invention will be apparent to those skilled in the art by reading the following description of the best modes for carrying out the present invention, with reference to the attached drawings, in which.

DETAILED DESCRIPTION OF THE PREFERRED EMBODIMENTS

Figure 1:
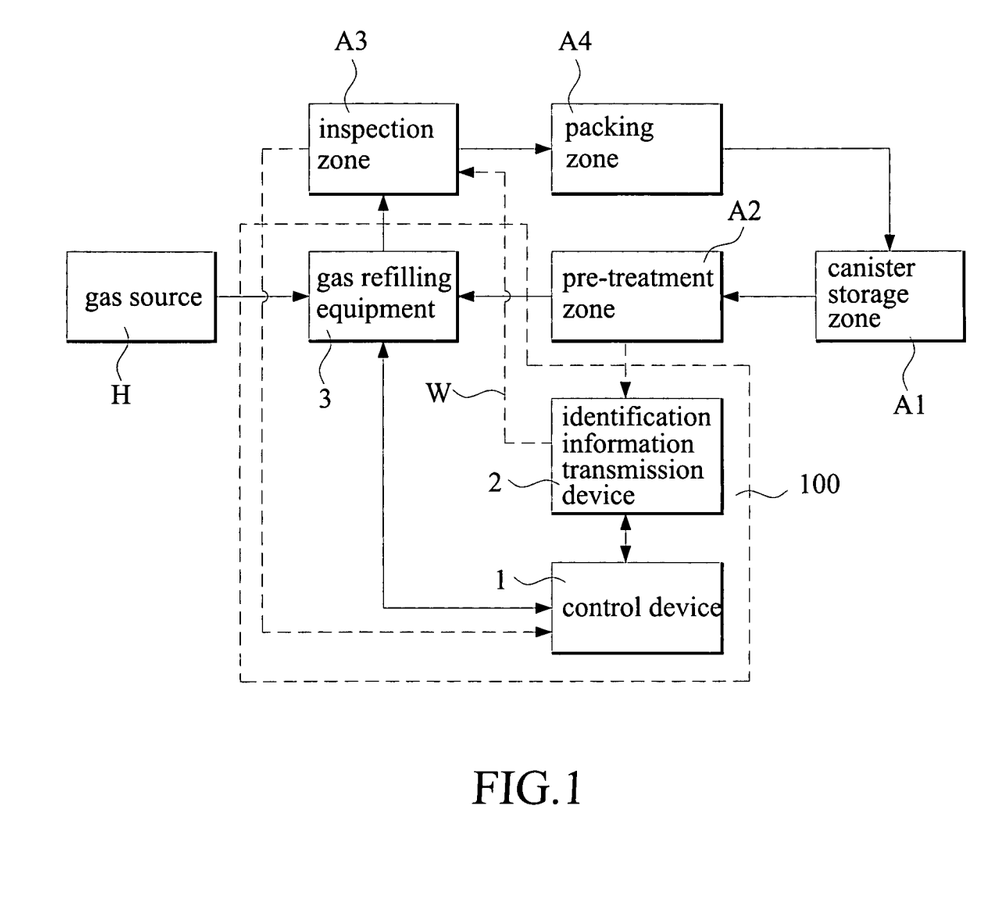
FIG. 1 is a schematic view illustrating a practical application of the present invention to inspection and dispatch of a gas storage canister.

With reference to the drawings and in particular to FIG. 1, which is a schematic view illustrating a practical application of the present invention to inspection and dispatch of a gas storage canister, a canister refilling management system according to the present invention, generally designated at 100, when used in an application to inspection and dispatch of gas storage canisters, is used in combination with a canister storage zone A1, a pre-treatment zone A2, an inspection zone A3, and a packing zone A4.

The canister refilling management system 100 comprises a control device 1, which is connected to an identification information transmission device 2 and gas refilling equipment 3. The gas refilling equipment 3 supplies gas from a gas source H to a storage canister 5 (see FIG. 2).

Figure 2:
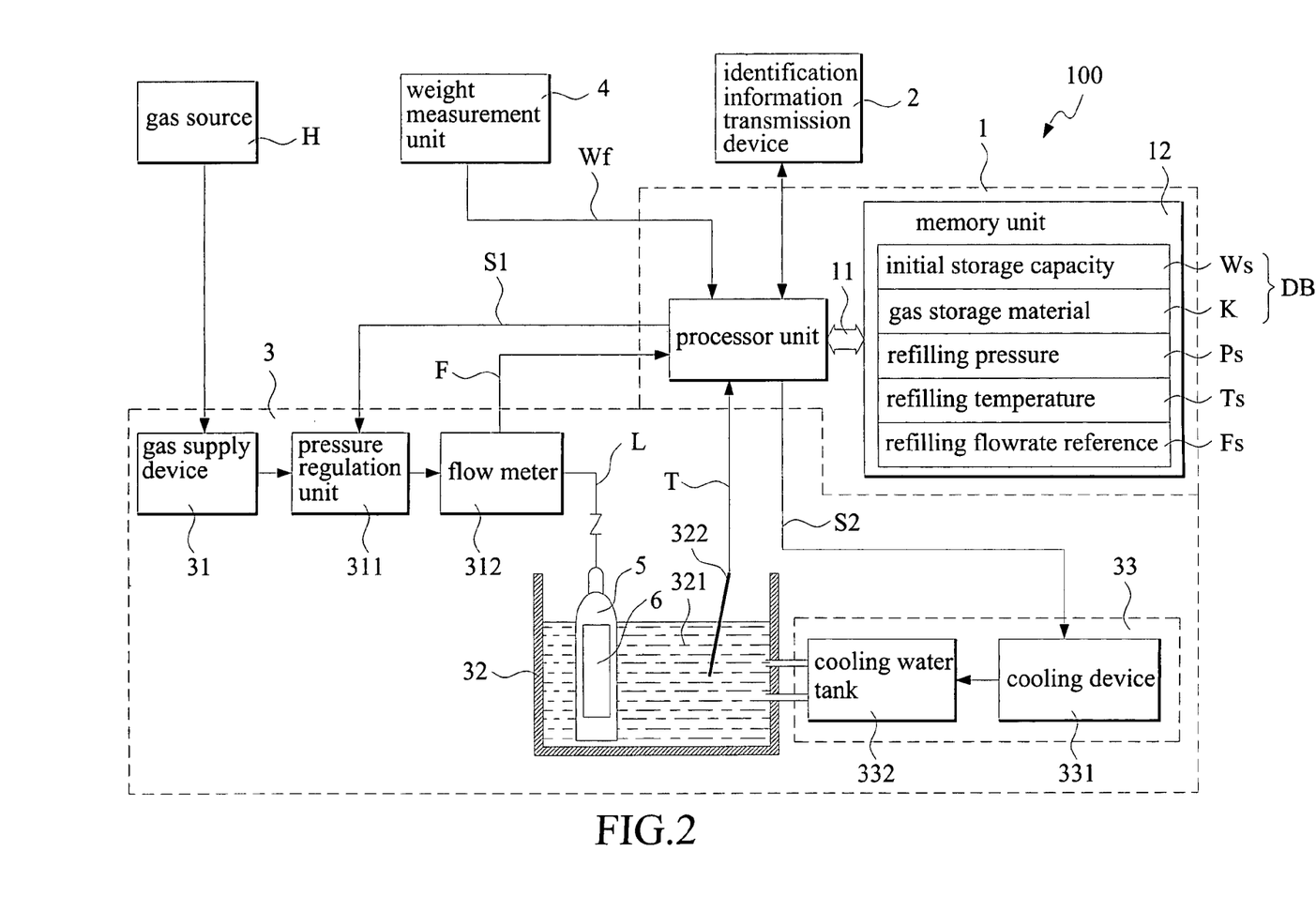
FIG. 2 is a system block diagram of the present invention.
Figure 3:
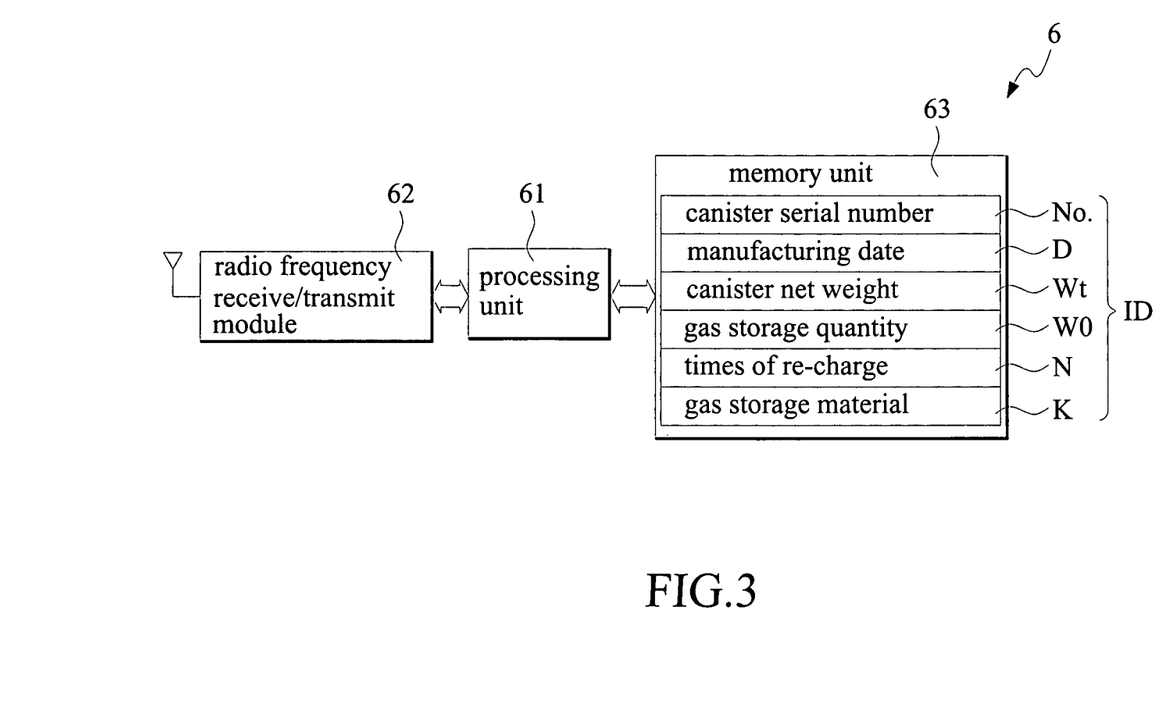
FIG. 3 is a circuit block diagram of an information identification label according to the present invention.

FIGS. 2 and 3 respectively show a system block diagram of the present invention and a circuit block diagram of an information identification label according to the present invention. The control device 1 of the canister refilling management system 100 comprises a processor unit 11 and a memory unit 12. The processor unit 11 is connected to an identification information transmission device 2 and a weight measurement unit 4. The memory unit 12 is connected to the processor unit 11 and stores therein information, such as refilling conditions, including a system parameter database DB, a refilling pressure Ps, a refilling temperature Ts, a refilling flowrate reference Fs, and the likes. The system parameter database DB contains parameters of for example initial storage capacity Ws and gas storage material K for each of various types of storage canister.

The gas refilling equipment 3 comprises a gas supply device 31, a water tank 32, and a temperature regulation device 33. The gas supply device 31 conveys the gas received from the gas source H through a gas supply pipe line L to a storage canister 5. The gas supply pipe line L comprises a pressure regulation unit 311 and a flow meter 312 mounted thereto. The pressure regulation unit 311 regulates the refilling pressure in a refilling operation of the storage canister 5. The flow meter 312 detects a gas flowrate F in refilling the storage canister 5.

The water tank 32 contains therein a predetermined amount of water 321 and comprises a temperature detection element 322 that is connected to the processor unit 11 to detect the water temperature T of the water tank 32. The temperature regulation device 33 regulates a surface temperature of the storage canister 5 and comprises a cooling device 331 and a cooling water tank 332. The cooling water tank 332 communicates with the water tank 32 and can be cooled by the cooling device 331 in order to regulate the water temperature of the water tank 32 for facilitating the progress of a refilling operation.

The storage canister 5 is provided with an information identification label 6. In the instant embodiment, the information identification label 6 comprises a radio frequency identification (RFID) tag, which comprises a processing unit 61, a radio frequency receive/transmit module 62, and a memory unit 63.

The radio frequency receive/transmit module 62 transmits and receives a radio frequency signal. The memory unit 63 contains therein at least one record of canister information (ID), which may include canister serial number (No.), manufacturing date (D), canister net weight (Wt), gas storage quantity (W0), times of re-charge (N), gas storage material (K), and the likes.

Figure 4:
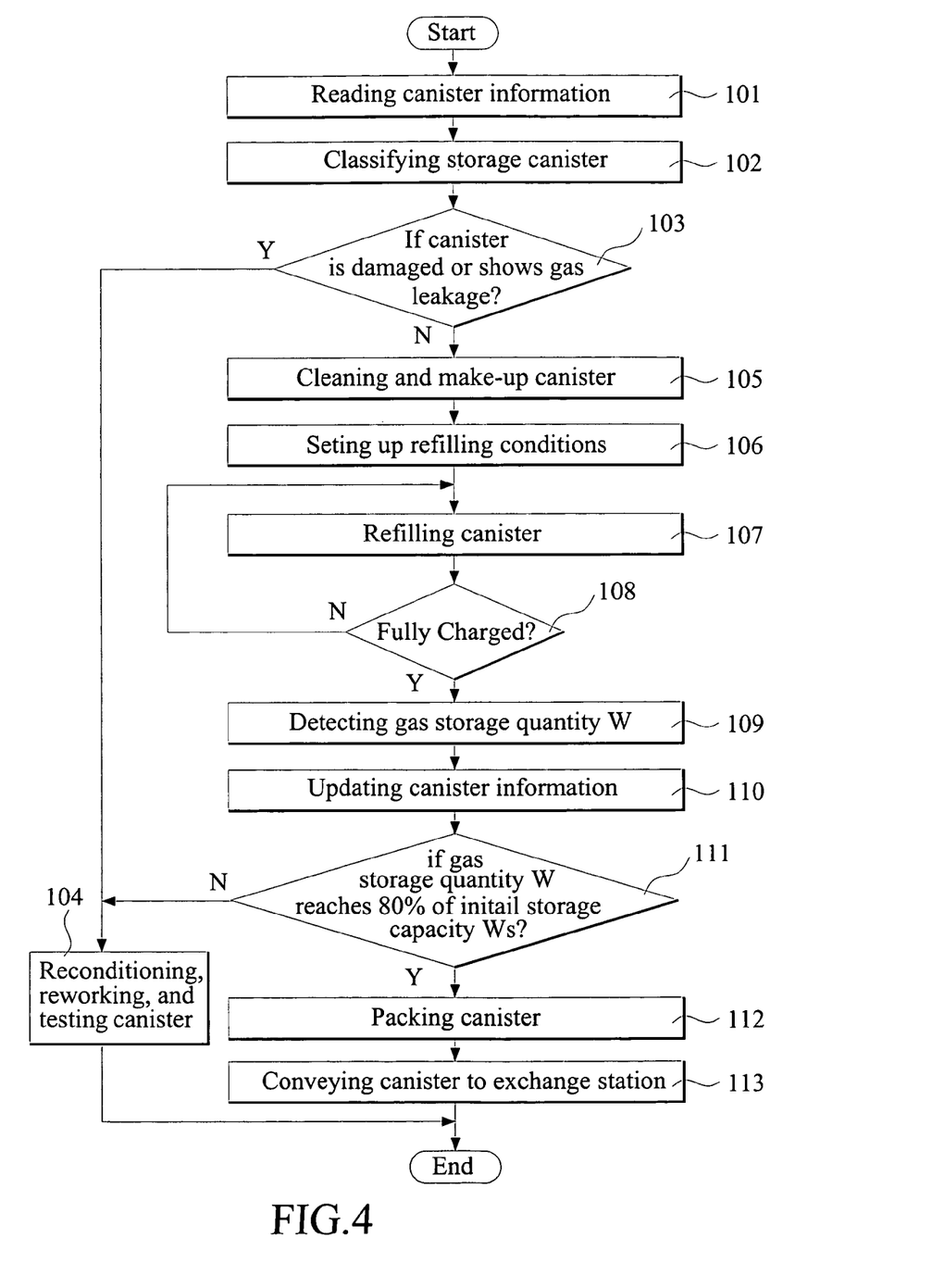
FIG. 4 illustrates a flow chart of a method according to a first embodiment of the present invention.

Referring to FIG. 4, which illustrates a flow chart of a method according to a first embodiment of the present invention, and referring FIGS. 1-3 as well, the method of the present invention will be explained as follows.

After a storage canister 5 runs out of the gas storage thereof, a user may send the canister to an exchange station for replacement by a charged storage canister. The exhausted canister can be further sent to a gas supply site to be charged there, or the exchange station performs a refilling operation to charge gas to the exhausted canister. The storage canister 5 may be collected in the canister storage zone A1 of the exchange station or the gas supply site for temporal storage and may be subsequently conveyed to the pre-treatment zone A2 when it is desired to carry out refilling management. If necessary, pre-classification may be made. In this condition, the processor unit 11 of the control device 1 reads canister information (ID) contained in the information identification label 6 of the storage canister 5 through the identification information transmission device 2 (which in the instant embodiment is an RFID reader/writer device) (Step 101), so as to retrieve the canister serial number (No.), the manufacturing date (D), the canister net weight (Wt), the gas storage quantity (W0), times of re-charge (N), the gas storage material, and the likes.

After reading the canister information (ID), the processor unit 11 carries out classification of the storage canister 5 according to the read canister information (ID) with reference to the system parameter database DB stored in the memory unit 12 (Step 102), in order to determine the specification and type of the storage canister 5 and thereby identify corresponding refilling conditions and/or parameters associated with the specification identified, including initial storage capacity (Ws), gas storage material (K), and the likes.

Then, in the pre-treatment zone A2, safety inspection and classification are performed to the storage canister 5 to identify if the canister is damaged or shows gas leakage (Step 103). Items of safety inspection include canister airtightness test, canister deformation test, canister damage test, and the like. Once it is identified that the canister is damaged or shows gas leakage, the storage canister 5 is sent to reconditioning, reworking, and testing (Step 104). If the canister is in good condition, then the storage canister 5 is subjected outside cleaning and make-up (Step 105) and then conveyed to the gas refilling equipment 3.

Then, the storage canister 5 (such as a hydrogen storage canister) is placed into the water tank 32 of the gas refilling equipment 3 and is connected to the gas supply pipe line L. Afterwards, the processor unit 11 sets up refilling conditions for the storage canister 5 (Step 106). In the instant embodiment, preset refilling pressure may be used, or alternatively, a refilling pressure Ps and a refilling temperature Ts retrieved from the memory unit 12 may be adopted. Based on such refilling conditions, a refilling operation is performed on the storage canister 5 (Step 107).

During the refilling operation, the gas supply device 31 supplies the gas (such as hydrogen) received from the gas source H through the pressure regulation unit 311 and the flow meter 312 to the storage canister 5. For control of pressure, the pressure regulation unit 311 is controlled by the processor unit 11, which generates a refilling pressure regulation signal S1 according to the set refilling pressure Ps for regulation of the refilling pressure.

For control of temperature, the temperature regulation device 33 is controlled by the processor unit 11, which generates a refilling temperature regulation signal s2 according to the set refilling temperature Ts to control the operation of the cooling device 331 for selectively cooling the cooling water tank 332 and subsequently cooling the water 321 contained in the water tank 32 to facilitate refilling of the gas (such as hydrogen). Meanwhile, the processor unit 11 uses the temperature detection element 322 to perform detection of the water temperature T of the water tank 32 and further enables the temperature regulation device 33 to regulate the water temperature T of the water tank 32 to maintain the temperature of the storage canister 5 below the set refilling temperature Ts during the refilling operation.

On the other hand, the processor unit 11 uses the flow meter 312 to detect and monitor the gas flowrate F when refilling the storage canister 5, and determines if the storage canister 5 is fully charged based on the detection of gas flowrate (Step 108). A detection identifying that the gas flowrate F is higher than the refilling flowrate reference Fs indicates that the storage canister 5 is not fully charged, and the refilling operation continues. A detection identifying that the gas flowrate F is lower than the refilling flowrate reference Fs indicates that the storage canister 5 is fully charged and the gas supply device 31 is stopped for further supply of gas and the temperature regulation device 33 is also stopped for operation.

After being fully charged, the storage canister 5 is conveyed to the inspection zone a3 to detect gas storage quantity w of the charged canister (Step 109). In the instant embodiment, a measurement of the weight of the charged storage canister 5 is made by the weight measurement unit 4, and the canister weight Wf so obtained is transmitted to the processor unit 11, whereby the processor unit 11 subtracts the canister net weight Wt retrieved from the memory unit 63 of the information identification label 6 from the canister weight Wf to calculate the gas storage quantity W (namely Wf−Wt=W).

Afterwards, the gas storage quantity W is used to update the canister information (ID) stored in the memory unit 63 of the information identification label 6 (Step 110). Certainly, other information, such as times of re-charge (N) may be updated at the same time if desired.

In the preferred embodiment of the present invention, the information identification label 6 comprises an RFID tag, so that the updating of the canister information (ID) can be carried out easily. Besides the updating of the information, other data associated with in-refilling condition and after-refilling condition of the storage canister 5 may be selectively stored in the system parameter database DB if desired for future tracking. When the storage canister 5 is sent back for refilling again, the previous refilling associated data may be accessed for improving the management of refilling.

In a practical application, the information or data can be simply stored in the system parameter database DB, and the updating of the canister information (ID) may not be made. If no updating will be made on the information identification label 6, the label does not need to comprise an RFID tag that is both readable and writable, and may be replaced by a barcode label to show essential data.

After the updating of the canister information (ID), the processor unit 11 makes a comparison of the gas storage quantity w with the initial storage capacity Ws contained in the system parameter database DB, and in the instant embodiment, it is determined if the gas storage quantity w reaches 80% of the initial storage capacity Ws (Step 111). In this respect, the initial storage capacity Ws is taken as a reference to identify the quantity of gas that can be stored in a normal storage canister, thereby serving as the gas storage capacity of a storage canister. In other words, when the gas storage quantity W of a charged canister is detected lower than a predetermined percentage of the initial storage capacity Ws, it is identified that the gas storage capacity of the storage canister 5 deteriorates significantly and consequently, the disqualified storage canister 5 must be reconditioned, reworked, and tested.

If the detected gas storage quantity W reaches for example 80% of the initial storage capacity Ws, it is identified that the storage canister 5 has a normal gas storage capacity and the canister can be conveyed to the packing zone A4 for packing (Step 112), where a protective enclosure is put over the storage canister 5. The canister is then sent back to the canister storage zone A1 for subsequent conveyance of the storage canister 5 to the exchange station (Step 113) or other exchange facility or supply center to be dispatched or supplied to users.

Figure 5:
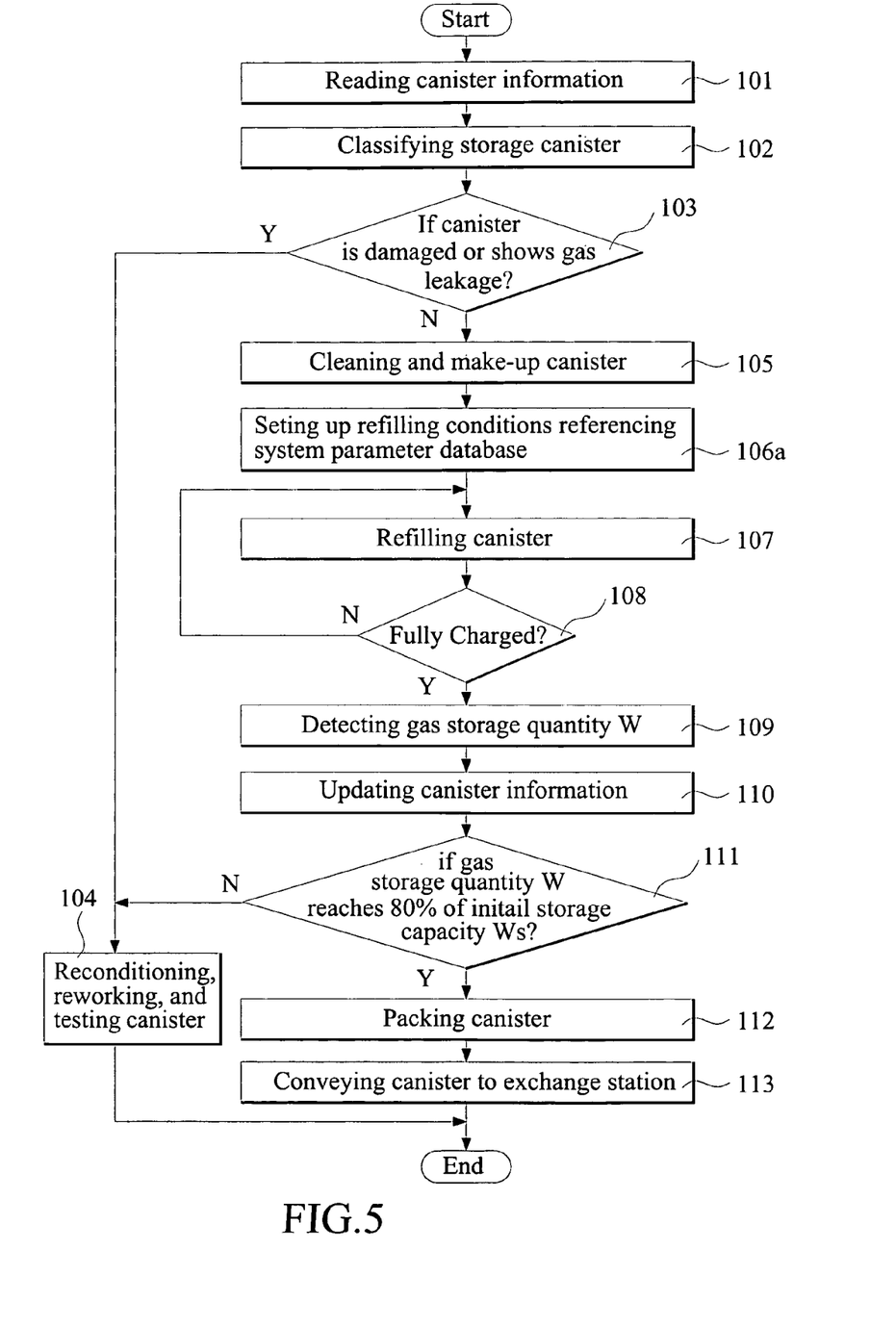
FIG. 5 illustrates a flow chart of a method according to a second embodiment of the present invention.

FIG. 5 illustrates a flow chart of a method according to a second embodiment of the present invention. The method of the second embodiment is similar to that of the first embodiment, so that similar steps are labeled with the same reference numerals. A difference between the two embodiments resides in that in the second embodiment, the processor unit 11, based on the canister classification that was determined previously, sets up the refilling conditions for the storage canister 5 according to the canister information (ID) read from the information identification label 6 of the storage canister 5. Further, referencing the system parameter database DB, the processor unit 11 sets up the refilling conditions for the storage canister 5 (Step 106a), for example, sets a refilling pressure Ps and adjusts a refilling temperature Ts in order to be completely fit for different storage canisters 5 for performing refilling under the optimum condition to get the best result of refilling.

Figure 6:
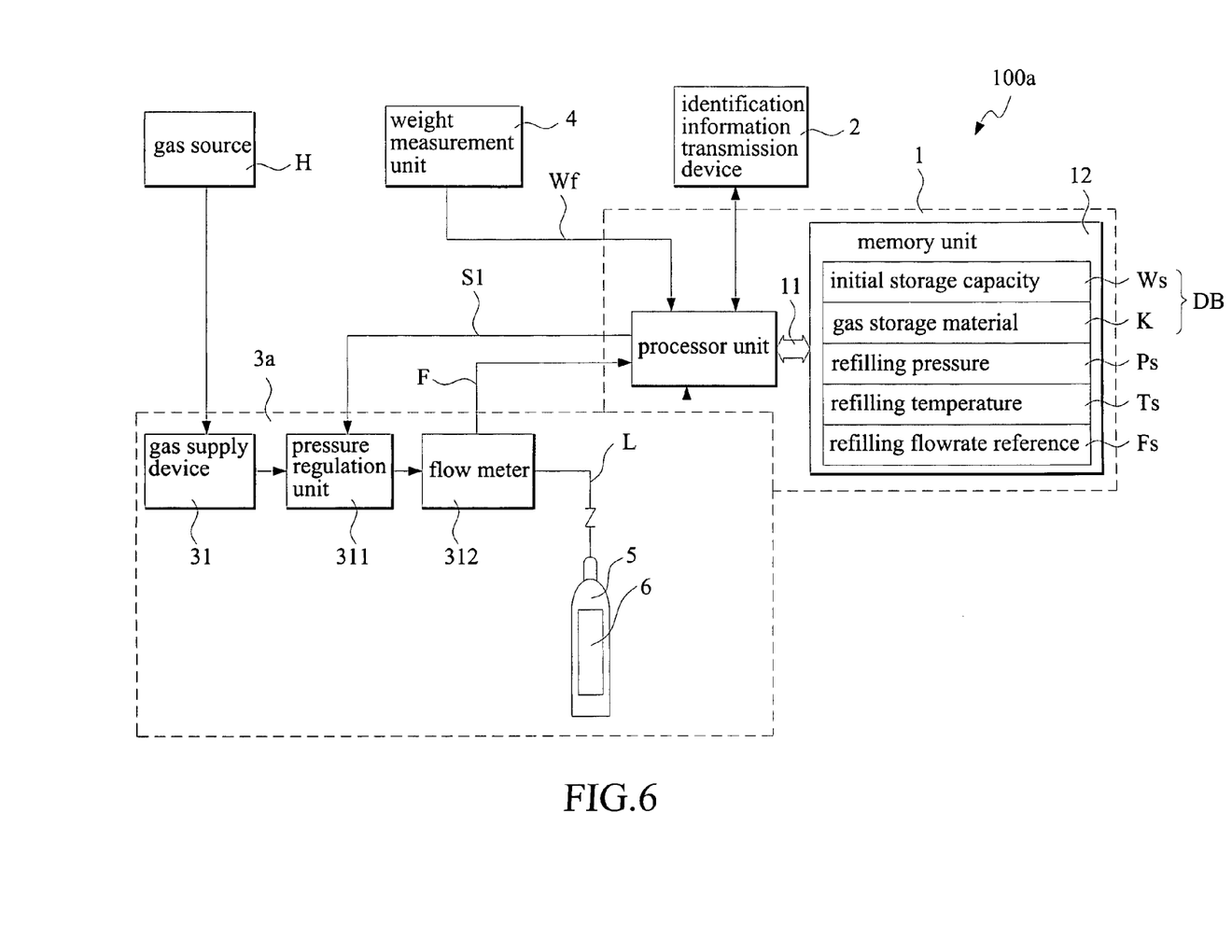
FIG. 6 is a system block diagram of another embodiment of the present invention.

FIG. 6 is a system block diagram of another embodiment according to the present invention. In this embodiment, the canister refilling management system 100a is arranged substantially similar to the previous embodiment, so that similar components/parts are labeled with the same reference numerals for consistency. A difference is that in the previous embodiment, the gas refilling equipment 3 is suitable for refilling hydrogen and thus a water tank 32 and a temperature regulation device 33 are required, but in the instant embodiment, the gas refilling equipment 3a is used to charge gases including oxygen and carbon dioxide, so that the arrangement is simplified by omitting the water tank 32 and the temperature regulation device 33.

Although the present invention has been described with reference to the preferred embodiments thereof and the best modes for carrying out the present invention, it is apparent to those skilled in the art that a variety of modifications and changes may be made without departing from the scope of the present invention which is intended to be defined by the appended claims.

What is claimed is:

1. An information identification combined canister charging management method of a canister refilling management system for management of refilling at least one gas storage canister, wherein the canister refilling management system includes a control device, an identification information transmission device and gas refilling equipment, the gas storage canister being provided with an information identification label being a radio frequency identification tag which contains therein at least one record of canister information, the method comprising the following steps:
   (a) reading the canister information contained in the radio frequency identification tag by the identification information transmission device;
   (b) setting a gas refilling condition including a refilling pressure and a refilling temperature according to the canister information so read by the control device; and;
   (c) carrying out a gas refilling operation on the storage canister according to the gas refilling condition by the gas refilling equipment.

2. The method as claimed in claim 1 further comprising, after step (a), a step of classifying the storage canister by the control device according to the canister information.

3. The method as claimed in claim 1 further comprising, after step (a), a step of identifying if the storage canister is damaged or shows gas leakage by the canister refilling management system.

4. The method as claimed in claim 3 further comprising, after the step of identifying if the storage canister is damaged or shows gas leakage, a step of reconditioning, reworking, and testing the storage canister that is-damaged or shows gas leakage by the canister refilling management system.

5. The method as claimed in claim 1 further comprising, after step (a), a step of outside cleaning and make-up of the storage canister by the canister refilling management system.

6. The method as claimed in claim 1 further comprising, after step (c), a step of determining if the storage canister is fully charged by the control device.

7. The method as claimed in claim 1 further comprising, after step (c), the following steps:
(d) detecting a gas storage quantity of the storage canister after refilling by the control device; and
(e) updating the canister information with the detected gas storage quantity by the canister refilling management system.

8. The method as claimed in claim 7 further comprising, after step (e), the following steps:
(f) comparing the gas storage quantity with a preset initial storage capacity by the control device; and
(g) sending the storage canister for reconditioning, reworking, and testing by the canister refilling management system when the gas storage quantity is identified to be lower than a predetermined percentage of the initial storage capacity for that canister.

9. The method as claimed in claim 1 further comprising, after step (c), a step of packing the storage canister by the canister refilling management system.

10. An information identification combined canister charging management method of a canister refilling management system for management of refilling at least one gas storage canister, wherein the canister refilling management system includes a control device, an identification information transmission device and gas refilling equipment, the gas storage canister being provided with an information identification label being a radio frequency identification tag which contains therein at least one record of canister information, the method comprising the following steps:
(a) reading the canister information contained in the radio frequency identification tag by the identification information transmission device;
(b) carrying out a gas refilling operation on the storage canister by the gas refilling equipment;
(c) detecting a gas storage quantity of the storage canister after gas refilling by the control device; and
(d) updating the canister information with the detected gas storage quantity by the canister refilling management system.

11. The method as claimed in claim 10 further comprising, after step (a), a step of classifying the storage canister by the control device according to the canister information.

12. The method as claimed in claim 10 further comprising, after step (a), a step of identifying if the storage canister is damaged or shows gas leakage by the canister refilling management system.

13. The method as claimed in claim 12 further comprising, after the step of identifying if the storage canister is damaged or shows gas leakage, a step of reconditioning, reworking, and testing the storage canister that is damaged or shows gas leakage by the canister refilling management system.

14. The method as claimed in claim 10 further comprising, after step (a), a step of outside cleaning and make-up of the storage canister by the canister refilling management system.

15. The method as claimed in claim 10 further comprising, after step (a), a step of setting a refilling condition by the control device according to the canister information.

16. The method as claimed in claim 15 further comprising, after step (a), a step of setting a refilling pressure by the control device according to the refilling condition.

17. The method as claimed in claim 15 further comprising, after step (a), a step of setting a refilling temperature by the control device according to the refilling condition.

18. The method as claimed in claim 10 further comprising, after step (b), a step of determining if the storage canister is fully charged by the control device.

19. The method as claimed in claim 10 further comprising, after step (d), the following steps:
(e) comparing the gas storage quantity with a preset initial storage capacity by the control device; and
(f) sending the storage canister for reconditioning, reworking, and testing by the canister refilling management system when the gas storage quantity is identified to be lower than a predetermined percentage of the initial storage capacity for that canister.

20. The method as claimed in claim 10 further comprising, after step (d), a step of packing the storage canister by the canister refilling management system.

* * * * *